Dec. 21, 1965 W. H. MIDDENDORF 3,225,299
ELECTROSTATIC CHARGE TRANSFER TACHOMETER
Filed May 16, 1961 2 Sheets-Sheet 1

INVENTOR.
William H. Middendorf.
BY
Wood, Herron & Evans.
ATTORNEYS.

United States Patent Office 3,225,299
Patented Dec. 21, 1965

3,225,299
ELECTROSTATIC CHARGE TRANSFER TACHOMETER
William H. Middendorf, 407 Kentucky Drive, Fort Wright, Covington, Ky.
Filed May 16, 1961, Ser. No. 110,570
13 Claims. (Cl. 324—70)

The present invention relates to measuring devices and is particularly directed to a novel tachometer for measuring the speed of a rotating shaft.

In the past, many different types of tachometers have been proposed for measuring the speed of a rotating body. While these devices have proven satisfactory for many uses, each of the devices has inherent disadvantages. For example, it has previously been suggested to measure shaft speed by means of miniature D.C. or A.C. induction tachometer generators. A D.C. generator is disadvantageous since the output voltage of such a generator contains a low frequency ripple voltage due to the fact that the voltage is rectified by means of commutator bars and brushes. Also, at high velocities, brush jump occurs which causes spurious voltages of substantial magnitude. Moreover, the brushes required in a D.C. generator produce an appreciable amount of friction, i.e., of the order of 1 oz.-inch. When a D.C. tachometer generator is used to measure the speed of a small, low power motor the added frictional load at times adversely affects the operation of devices driven by the motor. Also, the rotor possesses a high inertia. Thus, it is difficult to utilize a D.C. generator to accurately measure transient speed changes of a small motor.

The A.C. drag cup induction generators which have been proposed for use as tachometers eliminate certain disadvantages of the D.C. generator, such as brush friction and high inertia. However, the A.C. drag cup generators also suffer from certain inherent drawbacks. Among these drawbacks is the fact that the drag cup generator output contains third and fifth harmonic components caused by the non-linearity of the magnetic circuit. These generators are also disadvantageous because they produce a residual voltage, i.e., the voltage output is not zero for zero shaft speed.

A still further disadvantage of A.C. generators is that the phase of the output signal is shifted whenever a speed change occurs in the generator shaft. Thus, if the shaft speed changes rapidly there is an inherent time delay in the output signal. Still a further disadvantage of these generators is that they required the use of additional rectifying and filtering circuit components in order to provide a direct current output, such as is frequently required in servo mechanism controls.

Another type of tachometer which has previously been suggested in the pulse counting type. In one form of tachometer of this type light pulses are reflected from light marks provided on the rotating shaft, the speed of which is to be measured. In order modifications, slits provided in a thin disc are effective to pass a number of light pulses proportional to the speed of the rotating shaft. However, no matter what type of mechanism is employed to produce the pulse train, it will be appreciated that in any event the signal originally obtained is in the form of a train of frequency modulated pulses. A substantial amount of expensive and relatively complex circuit components are required to transform this frequency modulated pulse train to a D.C. voltage, the magnitude of which is correlated with shaft speed.

The principal object of the present invention is to provide a novel tachometer of exceedingly simple construction which is free from the defects inherent in the prior art devices and which combines for the first time the desiderata of a liner direct current output, no residual output, an exceedingly rapid electrical response, low inertia and low friction.

More particularly, the present invention is predicated upon the concept of utilizing the rate of transfer of charges, electrostatically deposited upon the dielectric surface of a rotor, from one electrode to another as a measure of velocity. Specifically, the present invention comprehends a tachometer including two stationary electrodes disposed in spaced relationship to a rotatable member interconnected to the shaft of unknown speed. This member includes a conductive portion and a dielectric or insulated sheath. A sufficiently high D.C. potential is applied across the electrodes to provide an elecrostatic field effective to cause field emission to occur from the negative electrode. Electrons emitted from this electrode move in the presence of the field toward the conductive portion of the rotor and in the process of their movement become trapped upon the area of the dielectric sheath immediately adjacent to the emitting electrode.

As the rotor is moved in conformity with the rotation of the shaft of unknown speed, the charged area of the rotor is shifted to a position adjacent to the second or positive electrode. Under the influence of the field adjacent this electrode, the electrons previously stored upon the rotor are drawn to the positive electrode which is effect wipes the rotor clean. These electrons are returned from the positive electrode to the power source.

In accordance with the present invention, a resistor is placed in electrical series connection with the electrodes and power source and the current flowing in the circuit is measured by measuring a potential developed across this resistor. For a given interelectrode potential, the current flow in the circuit connecting the electrodes varies with the rate of which charges are carried by the rotor from the negative electrode to the positive electrode. I have determined that this current varies linearly with the speed of rotation of the rotor shaft, and that a zero current flows at zero shaft speed.

One of the principal advantages of the present tachometer is that it is of extremely simple construction. Moreover, the output circuit for obtaining a reading of the tachometer output is equally simple there being no need for special rectifiers, frequency responsive circuits, or the like.

Another advantage of the present invention is that the output signal of the tachometer is already in the most useful form for use in conjunction with servo mechanism units and the like. More particularly, the present tachometer unit produces an amplitude modulated direct current signal having no residual component so that the output signal is zero for zero output shaft speed. Moreover, the output signal of the present tachometer varies linearly with shaft speed.

Still another advantage of the output signal of the present tachometer is that it varies instantaneously with changes in shaft speed.

A further advantage of the present tachometer is that the device interferes only to a minimum extent with the normal operation of the device being measured even though that device may be driven by a relatively low powered motor or the like. Thus, the present tachometer requires no commutators, brushes or other frictional contact elements. Consequently, the tachometer introduces only the minimum friction inherent in the rotor shaft bearings. Moreover, the rotor has a very low inertia since it comprises only a conductive portion and an insulating sheath both of which can be formed from extremely lightweight materials. Thus, for example, in one embodiment the rotor may be formed of a glass cylinder, the interior of which is coated with a conductive paint. In this embodiment, the paint constitutes the conductive portion of the rotor while the glass cylinder constitutes the dielectric sheath.

These and other objectives and advantages of the present invention will be more readily apparent from a consideration of the following detailed description of the drawings illustrating a preferred embodiment of the invention.

Figure 1:
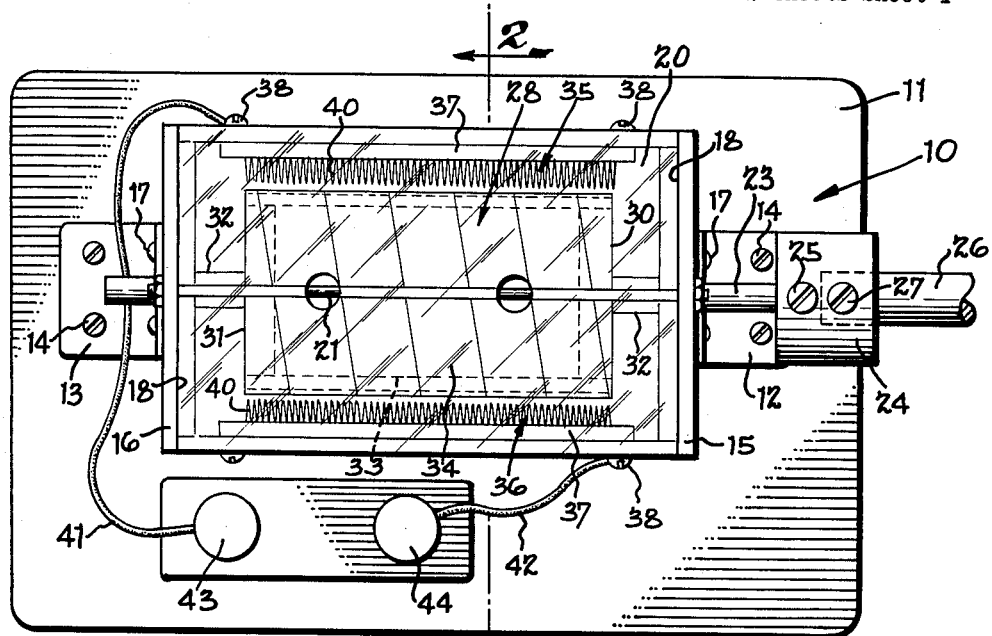
FIGURE 1 is a top plan view of a tachometer constructed in accordance with the principles of the present invention.

As is shown in FIGURE 1, the tachometer 10 comprises a base 11 which supports two spaced angle bracket members 12 and 13. These members are secured to the base in any suitable manner, such as by means of bolts 14. Each of the angle brackets supports an end plate 15 and 16. End plates 15 and 16 are formed of any suitable material, such as aluminum, and are secured to the angle brackets in any suitable manner, such as by means of bolts 17.

Figure 2:
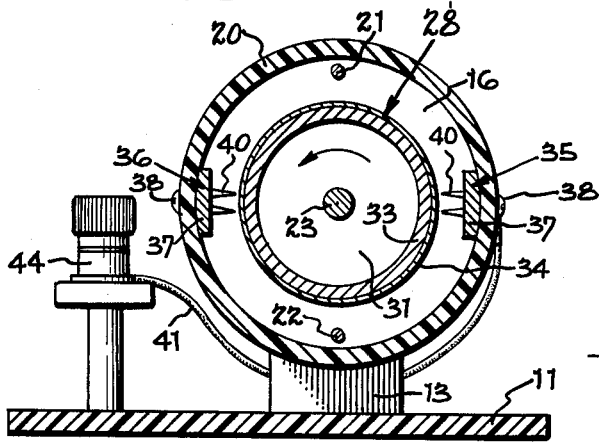
FIGURE 2 is a cross sectional view of the tachometer taken along line 2—2 of FIGURE 1.
Figure 3:
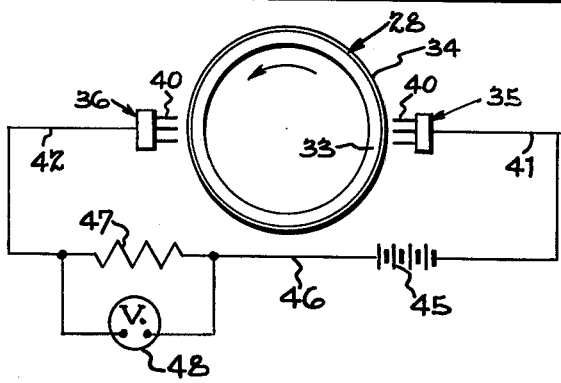
FIGURE 3 is a schematic circuit diagram of the tachometer shown in FIGURE 1.

As shown in FIGURES 1 and 2, each of the end plates 15 and 16 is provided with an annular shoulder 18 which receives the end of a housing cylinder 20. Housing cylinder 20 is formed of any suitable electrical insulating material, such as plexiglass. Two horizontal tie rods 21 and 22 interconnect the opposite end plates 15 and 16 to hold those plates tightly against cylinder 20. The cylinder 20 is thus mounted rigidly to the end plates and cannot rotate relative thereto.

An aperture is formed in the center of each of the end plates 15 and 16 and suitable ball bearings (not shown) are mounted in these apertures. A tachometer shaft 23 extends axially through cylinder 20 and is rotatably journalled in the two end roller bearings. One end of tachometer shaft 23 carries a coupling sleeve 24 which is held fast upon the shaft by means of a set screw 25. Coupling sleeve 24 is adapted to receive a shaft 26, the speed of which it is desired to measure. Sleeve 24 is secured to shaft 26 in any suitable manner, such as by means of a set screw 27.

Tachometer shaft 23 carries cylindrical drum member 28. Cylinder 28 comprises two end members 30 and 31 formed of any suitable lightweight material, for example aluminum stock. Each of these end members 30 and 31 is provided with a central bore which is press fit over shaft 23. Shaft 23 and hence drum 28 are held against longitudinal movement relative to cylinder 20 by means of bushings 32 which are disposed between end members 30 and 31 of the drum and the shaft bearings provided in the end plates 15 and 16. An electrically conductive cylinder 33 is carried by end members 30 and 31. This cylinder is formed of a lightweight conductive material such as aluminum having a wall thickness of $\frac{1}{16}$ of an inch. The cylinder is press fit over end members 30 and 31. The outer surface of conductive cylinder 33 is covered with a suitable dielectric sheath 34. One satisfactory form of sheath comprises a silicone tape wrapped around the periphery of the cylinder. In addition to the tape, the ends of the cylinder are painted with a suitable electrical insulating material, such as Formvar, to prevent arcing around the ends of the tape.

In addition to the rotor 28, housing cylinder 20 encloses two electrodes, or charging combs 35 and 36. Each of the charging combs comprises a conductive plate 37 formed of brass, or the like, secured as by means of bolts 38 to the inner surface of cylindrical housing 20. Each of these plates extends longitudinally of the housing and preferably the plates are disposed at diametrically opposite positions on the housing wall.

Each of the plates 37 carries a plurality of inwardly facing conductive needles 40. In the specific embodiment shown, the needles are formed of two rows of steel phonograph needles placed on $\frac{3}{32}$ inch centers and press fit into suitable openings drilled in the brass support plates. The air gap between the points of the needles and the dielectric sheath, in the embodiment shown, is substantially $\frac{1}{16}$ of an inch, although as shorter air gap is to be preferred. Conductive leads 41 and 42 are joined to each of the brass plates 37 and are respectively connected to output terminals 43 and 44 of the tachometer.

In addition to these elements, the present tachometer comprises a regulated D.C. power supply indicated diagrammatically at 45. The negative terminal of this power supply is connected to a negatively charged comb, or electrode, 35. The positive terminal of power supply 45 is connected through a lead 46 to one side of a load resistor 47, the other side of the resistor being connected to conductor 42 which is in turn joined to positive electrode 36. The output signal of the tachometer is measured by a suitable voltmeter 48 connected across resistor 47.

In operation, sleeve 24 is coupled to a shaft 26, the speed of which is to be determined. D.C. power supply 45 is energized to apply to electrodes 35 and 36 a sufficiently high voltage to cause a high field emission between them. In the embodiment shown, the potential applied to the electrodes 35 and 36 is of the order of 6000 volts. It will, of course, be appreciated that the requisite potential depends upon the electrode spacing, electrode temperature, and electrode construction. For example, a substantially lower potential is required if special electrodes are used. For example, if tungsten needle points are employed, such as those described in a paper entitled IRE Trans. on Military Electronics, volume MIL–4, No. 1, January 1960, pages 38–45, a voltage of only 320 volts between the electrodes 35 and 36 is requisite. Also, if the negative electrode is heated to provide thermionic emission, the necessary voltage is still further reduced to that necessary to attract the free electrons to the positive electrode 36 pulse the drop across the load resistor 47.

In any event, when a sufficient potential is applied across electrodes 35 and 36, electrons leave the negative electrode and are drawn toward the insulated conductive rotor cylinder 33. These electrons are trapped, however, on the outer surface of the dielectric sheath. Consequently, these trapped electrons tend to prevent other electrons from leaving the electrode points. In fact, if the rotor is stationary, the flow of electrons from the negative electrode to the surface of the sheath rapidly diminishes to zero and the unit merely functions as a simple capacitor of relatively low capacitance.

However, when shaft 26 is rotated, it causes a similar rotation in shaft 23. The area of the sheath 34 covered with electrons moves away from the negative electrode comb 35 toward the positive electrode comb 36. As drum 28 rotates, other electrons are emitted from comb 35, and these electrons flow to the newly exposed, uncharged areas of the rotor then adjacent to the electrode points of comb 35.

At the same time that areas of the dielectric sheath are being charged by electrons emitted from negative electrode 35, other electrons are being drawn from the surface of the dielectric sheath in the area immediately adjacent to positive electrode 36. This electrode is effective to attract all of the electrons previously stored in are area of the drum now adjacent to the positive electrode and thus in effect wipes the rotor clean. The electrons attracted to the positive electrode 36 flow through conductor 42 and load resistor 47 and are returned to the positive terminal of the D.C. power supply 45. Since resistor 47 is placed in series circuit relation with the power supply and electrodes 35 and 36, the rate of flow of electrons, or current, is readily measured by means of a suitable voltage measuring device connected across resistor 47.

Figure 6:
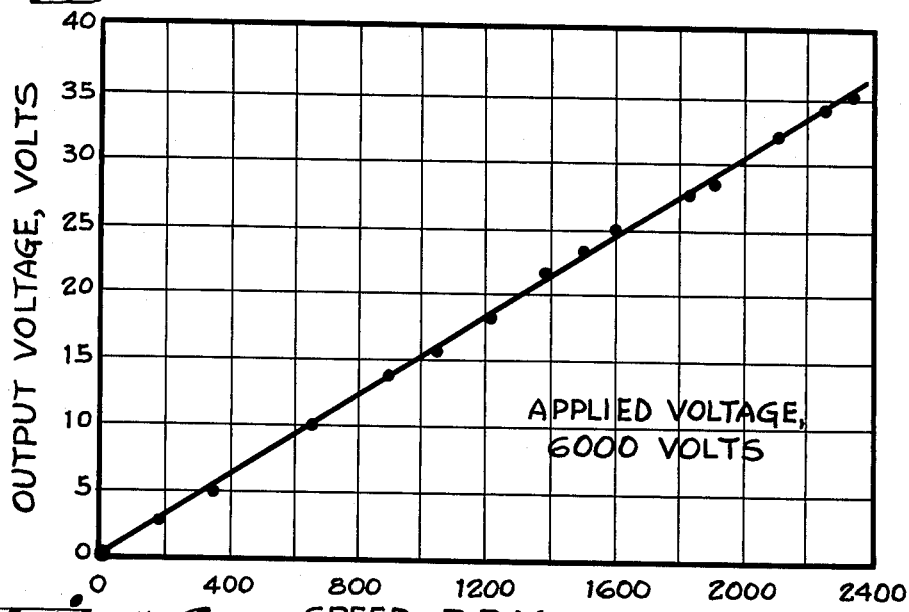
FIGURE 6 is a graph showing the relationship of the voltage output of the tachometer with the speed of the tachometer rotor.

It has been empirically determined that the voltage output of the tachometer varies linearly with the speed of the tachometer shaft and hence with the shaft being measured. FIGURE 6 is a graph in which the output voltage is plotted against the shaft speed in r.p.m.'s. It will be noted that the output voltage measured across resistor 47 varies linearly (within the limits of experimental error) from zero volts at zero r.p.m.'s to 35 volts at approximately 2350 r.p.m.'s.

A theoretical explanation of this linear relationship can be obtained by analogizing the tachometer to a diode vacuum tube in which the plate current is inhibited by the insulating sheath which is placed between the anode, or positive electrode, 36 and the cathode, or negative electrode 35. Since the time required to saturate an area of the insulated cylinder, or sheath with charge is negligible compared to the time necessary to move the section from the influence of the negative electrode 35, the charge of the unit area will be a function of voltage and spacing. Specifically, $$\frac{dq}{dA} = f(v, l)$$

Where $dA$ is the differential area charged, $v$ is the applied voltage and $l$ is a characteristic distance.
But $$i \frac{dq}{dt} = \frac{dq}{dA} \frac{dA}{dt}$$

and $dA = ard\theta$ if $r$ is the outer radius of the rotor, and $a$ is its axial length. This gives $$i = f(v, l) ar \frac{d\theta}{dt}$$

Hence $$i = [f(v,l)ar]\omega$$

The last equation shows that so long as the voltage applied across electrodes 35 and 36 by power source 45 is constant, the tachometer functions as a current generator, the output of which is directly proportioned to angular speed $\omega$. The results predicted by this equation conform exactly with the empirical current speed relationships plotted in FIGURE 6.

It will be appreciated that so long as the velocity of the shaft 23, and hence the velocity of the surface of cylinder 28, is small in comparison with the speed of charge transfer between the electrodes and cylinder, there is no time lapse between any change in the speed of shaft 26 and the rate of change of voltage sensed by voltmeter 48. However, as a practical matter, in the embodiment shown in FIGURE 1, the output signal sensed by voltmeter 48 contains a large noise component as is to be expected in devices having electric discharge through gas. This noise component presents no difficulty if an averaging device, such as a vacuum tube voltmeter is utilized to indicate steady state speed. If, however, transient response is desired this noise component is troublesome.

Figure 4:
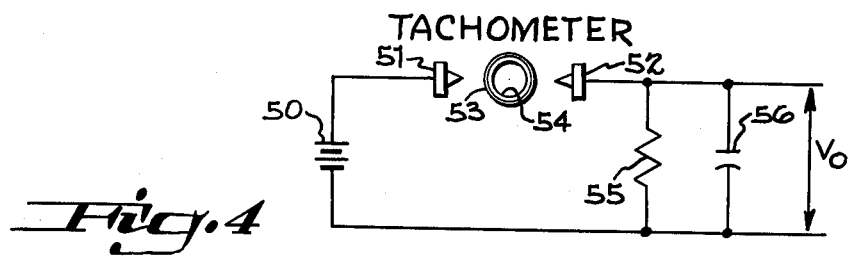
FIGURE 4 is a schematic circuit diagram of a slightly modified form of circuit including the present tachometer.

One compromise solution to obtaining a transient response with an acceptable noise level is indicated in the circuit diagram of FIGURE 4. In that circuit, a D.C. power supply 50 is connected in series with positive electrode 51 and negative electrode 52 of the tachometer. These electrodes are spaced relative to a rotating insulated sheath 53 surrounding a conductive cylinder 54 in exactly the same way as is shown in FIGURES 1 and 2. A load resistor 55 is also placed in series with the electrodes and D.C. power supply. However, in the embodiment shown in FIGURE 4, a capacitance 56 is connected in parallel with the load resistance and the output voltage indicated by the symbol $V_o$ is measured by a suitable device such as an oscilloscope connected across this parallel combination. The bypass capacitor functions to remove a portion of the high frequency noise. However, this capacitor does introduce into the circuit a time constant which limits the speed of response of the tachometer.

I have determined that in order to obtain optimum results from the tachometer, i.e., instantaneous transient response with no noise appearing in the output signal, the space surrounding the rotor and intermediate the rotor and electrodes should be evacuated. Obviously, if the unit disclosed in FIGURE 1 is employed in outer space, this vacuum condition is an ambient condition and no special evacuation of housing 20 is required.

Figure 5:
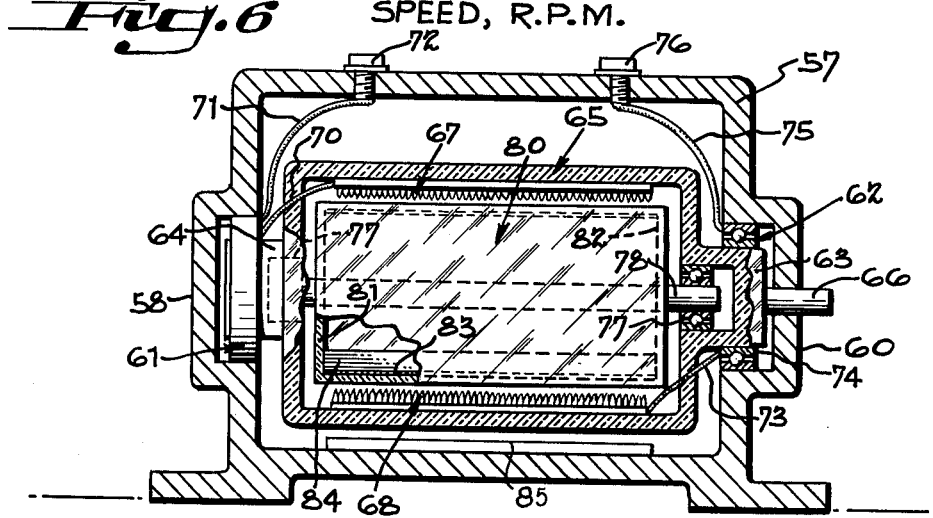
FIGURE 5 is a longitudinal cross sectional view partially broken away of a modified form of tachometer.

On the other hand, where a vacuum is not present as an ambient condition, a modified form of tachometer, such as that shown in FIGURE 5, is highly advantageous. As is there shown, the modified form of tachometer includes an outer housing 57 formed of metal, or any other suitable material. This housing is provided with two end bells 58 and 60 which house ball bearings 61 and 62. These ball bearings rotatably support hub portions 63 and 64 formed on inner housing 65. The inner housing is made of any light weight non-conductive material, such as glass.

Hub 63 of the inner housing is secured to a metal shaft 66 in any suitable manner. This shaft extends outwardly through an aperture in end bell 60. It is to be understood that the outer end of shaft 66 carries a suitable coupling member (not shown), such as a sleeve, similar to sleeve 24 for joining shaft 66 to a shaft, the speed of which is to be determined. It will be appreciated that inner housing 65 constitutes an integral closed chamber which is evacuated in any suitable manner. Inner housing 65 supports positive and negative electrode combs 67 and 68. These combs are identical with the combs shown in FIGURES 1 and 2 and are preferably disposed at diametrically opposed positions on the inner housing walls. One electrical lead 70 is taken from electrode 67 and is passed through glass housing 65 in any suitable manner, such as a glass to Kovar seal.

Lead 70 is connected to the inner race of ball bearing 61, while a second lead 71 is connected to the outer race of the ball bearing and to an output terminal 72. In a similar manner, electrode 68 is joined through a lead 73 passing through glass housing 65 to the inner race 74 of ball bearing 62, while a second lead 75 joins the outer race of this ball bearing with terminal 76.

These last named electrical connections facilitate the application of a D.C. potential across electrodes 67 and 68 despite the fact that in this modified embodiment the electrodes are rotated in synchronism with the shaft, of unknown velocity.

As is shown in FIGURE 5, each of the hub members 63 and 64 of inner housing 65 is hollow to provide a seat for an inner ball bearing 77—77. These ball bearings rotatably support a drum shaft 78. This drum shaft supports a cylindrical drum. In this embodiment, the drum comprises a cylindrical glass shell 80 wihch is fixedly mounted upon shaft 78 by means of suitable end members 81 and 82. The inner surface of glass cylinder 80 is coated with a conductive coating 83. It will be appreciated that in this embodiment, the paint coating 83 comprises a conductive cylinder which is functionally the same as the aluminum cylinder 28 in FIGURES 1 and 2, while the glass cylinder 80 is the functional equivalent of the insulating sheath formed by tape 34.

In the modified embodiment of FIGURE 5, means are also provided for holding the drum 80 stationary. One suitable form of such means comprises an elongated weight 84 mounted on the bottom of cylinder 80. The inertia of this member is sufficient to hold the cylinder substantially stationary against the frictional force imposed by inner bearings 77—77. Alternatively, weight 84 can be formed of a ferro magnetic material which cooperates with a permanent magnet, such as magnet 85, mounted upon stationary housing 57.

In the embodiment shown in FIGURE 5, a potential is applied across electrodes 67 and 68 in the same manner as in the embodiment of FIGURES 1 and 2. In the modified embodiment, electrons are drawn from the negative electrode by high field emission and collect upon the adjacent area of the insulated glass cylinder 80. As the positive electrode sweeps over the areas previously charged by the negative electrode, the stored electrons are attracted to the positive electrode and flow through a circuit including a load resistor to the power supply. Again, the current flowing through the circuit varies linearly with the velocity of shaft 66. Also, there is no current output for zero rotational speed of shaft 66.

From the foregoing disclosure of the general principles of the present invention and the above description of two preferred embodiments, those skilled in the art will readily comprehend the various modifications to which the present invention is susceptible. Thus, for example, it is contemplated that electrons can be drawn from the cathode to the rotor and can be drawn from the rotor to the anode in the presence of a magnet, as opposed to an electrostatic field. It is further contemplated that the housing surrounding the electrodes and rotor in FIGURE 1 can be evacuated in such a modification. The rotor shaft in such a modification is terminated internally of the housing and a magnet is mounted on the end of this rotor shaft adjacent to the end wall of the housing. A similar magnet is disposed adjacent to the end wall of the housing externally of the housing for rotation co-axially with the inner magnet. This outer magnet is carried by a rotatable shaft carrying a coupling, such as coupling 24, for joining the shaft to the shaft to be measured. Accordingly, I desire to be limited only by the scope of the following claims.

Having described my invention, I claim:

1. Apparatus for measuring the speed of a rotating member, said apparatus comprising a tachometer, said tachometer including a rotor rotatable about an axis and having a cylindrical conductive surface and a dielectric sheath overlying said surface, means for connecting said rotor for rotational movement with said rotating member, a first electrode disposed closely adjacent to said rotor but spaced from the dielectric sheath thereof, and a second electrode disposed closely adjacent to the rotor but spaced from the dielectric sheath portion thereof, said second electrode being spaced from said first electrode circumferentially with respect to said rotor, said electrodes extending axially of said rotor, means for applying a D.C. potential across said electrodes, said first electrode being effective to emit electrons, said second electrode being effective to collect electrons previously deposited on said sheath by said first electrode, and means responsive to the current flowing between said electrodes for indicating the velocity of said rotating member.

2. Apparatus for measuring the speed of a rotating member, said apparatus comprising a tachometer, said tachometer including a rotor rotatable about an axis and having a rotational conductive surface and a dielectric sheath overlying said surface, means for connecting said rotor for movement with said rotating member, a first electrode disposed closely adjacent to said rotor but spaced from the dielectric sheath thereof, and a second electrode disposed closely adjacent to the rotor but spaced from the dielectric sheath portion thereof, said second electrode being spaced from said first electrode circumferentially with respect to said rotor, said electrodes extending axially of said rotor, means for applying a D.C. potential across said electrodes, said potential being sufficiently great to cause field emission from said first electrode, said second electrode being effective to collect electrons previously deposited on said sheath by said first electrode, and means responsive to the current flowing between said electrodes for indicating the velocity of said rotating member.

3. Apparatus for measuring the speed of a rotating member, said apparatus comprising a tachometer, said tachometer including a cylindrical conductive surface and a dielectric sheath overlying said surface, a first electrode disposed closely adjacent to but spaced from said dielectric sheath, and a second electrode disposed closely adjacent to but spaced from said dielectric sheath, said second electrode being spaced from said first electrode circumferentially with respect to said cylindrical conductive surface, means for effecting rotating movement of said conductive surface and dielectric sheath relative to said electrodes in accordance with the speed of said rotating member, means for applying a D.C. potential across said electrodes, said first electrode being effective to emit electrons, said second electrode being effective to collect electrons previously deposited on said sheath by said first electrode, and evacuated housing means surrounding said electrodes, said conductive surface and said dielectric, and means responsive to the current flowing between said electrodes for indicating the velocity of said rotating member.

4. In apparatus for measuring the speed of a rotating member, a device comprising a housing, a shaft adapted to be interconnected to said member, means associated with said housing for rotatably journalling said shaft, a cylindrical rotor carried by said shaft, said cylindrical rotor comprising a conductive cylinder, and a dielectric cylinder surrounding said conductive cylinder, an emitter electrode closely spaced from the surface of said cylinder, a second electrode spaced from said cylinder in a position spaced from said first electrode circumferentially with respect to said rotor, said electrodes extending axially of said rotor, said first electrode being effective to emit electrons, said second electrode being effective to collect electrons previously deposited on said sheath by said first electrode.

5. In apparatus for measuring the speed of a rotating member, a device comprising a housing, a shaft adapted to be interconnected to said member, means carried by said housing for rotatably journalling said shaft, a cylindrical rotor carried by said shaft, said cylindrical rotor comprising a conductive cylinder coaxial with said shaft, and a dielectric sheath surrounding said conductive cylinder, a first electrode including a plurality of pointed electrode elements directed toward said dielectric sheath and being disposed adjacent to said sheath, and a second electrode including a plurality of pointed electrode elements directed toward and spaced from said sheath in an area spaced from said first electrode circumferentially with respect to said rotor, said electrodes extending axially of said rotor, said first electrode being effective to emit electrons, said second electrode being effective to collect electrons previously deposited on said sheath by said first electrode.

6. In apparatus for measuring the speed of a rotating member, a device comprising a housing, a shaft adapted to be interconnected to said member, means associated with said housing for rotatably journalling said shaft, a cylindrical rotor carried by said shaft, said cylindrical rotor comprising a conductive cylinder and a dielectric sheath surrounding said conductive cylinder, a first electrode comb, said electrode comb comprising a plurality of needlelike electrode points directed toward said sheath and disposed in a band extending parallel to the axis of said rotor shaft, a second electrode comb assembly, means mounting said second electrode comb assembly within said housing, said second electrode comb assembly including a plurality of needlelike electrodes facing inwardly toward said rotor, said electrode elements being disposed in a band parallel to said rotor shaft, said first electrode comb and said second electrode comb being spaced circumferentially relative to said cylindrical rotor, said first electrode comb being effective to emit electrons, said second electrode comb being effective to collect electrons previously deposited on said dielectric sheath by said first electrode.

7. In apparatus for measuring the speed of a shaft, a device comprising an outer housing, an inner housing, means rotatably supporting said inner housing upon said outer housing, means mounted upon said inner housing for joining said housing to a shaft the speed of which is to be measured, said inner housing forming an evacuated chamber, a drum, means mounting said drum for rotation relative to said inner housing, two electrodes mounted within said chamber, said electrodes being spaced apart circumferentially with respect to said drum, said drum comprising a conductive cylinder and an insulating cylinder surrounding said conductive cylinder, and means for holding said drum stationary relative to said outer housing, one of said electrodes being effective to emit electrons and the other of said electrodes being effective to collect electrons previously deposited by the other of said electrodes on the insulating cylinder.

8. In apparatus for measuring the speed of a shaft, a device comprising an outer housing, an inner housing, means rotatably supporting said inner housing upon said outer housing, means mounted upon said inner housing for joining said housing to a shaft the speed of which is to be measured, said inner housing forming an evacuated chamber, a drum, means mounting said drum for rotation relative to said inner housing, two electrodes mounted within said chamber, said electrodes being spaced apart circumferentially with respect to said drum, said drum comprising a conductive cylinder and an insulating cylinder surrounding said conductive cylinder, and means for holding said drum stationary relative to said outer housing, said last named means comprising a weight secured to a wall of said drum, one of said electrodes being effective to emit electrons and the other of said electrodes being effective to collect electrons previously deposited by the other of said electrodes on the insulating cylinder.

9. In apparatus for measuring the speed of a shaft, a device comprising an outer housing, an inner housing, means rotatably supporting said inner housing upon said outer housing, means mounted upon said inner housing for joining said housing to a shaft the speed of which is to be measured, said inner housing forming an evacuated chamber, a drum, means mounting said drum for rotation relative to said inner housing, two electrodes mounted within said chamber, said electrodes being spaced apart circumferentially with respect to said drum, said drum comprising a conductive cylinder and an insulating cylinder surrounding said conductive cylinder, and means for holding said drum stationary relative to said outer housing, said last named means comprising a ferro-magnetic member carried by said drum and a cooperating magnet secured to said outer housing, one of said electrodes being effective to emit electrons and the other of said electrodes being effective to collect electrons previously deposited by the other of said electrodes on the insulating cylinder.

10. In apparatus for measuring the speed of a shaft, a device comprising an outer housing, an inner housing, means rotatably supporting said inner housing upon said outer housing, means mounted upon said inner housing for joining said housing to a shaft the speed of which is to be measured, said inner housing forming an evacuated chamber, a drum, means mounting said drum for rotation relative to said inner housing, two electrodes mounted within said chamber, said electrodes being spaced apart circumferentially with respect to said drum, said drum comprising a conductive cylinder and an insulating cylinder surrounding said conductive cylinder, and means for holding said drum stationary relative to said outer housing, two electrical terminals mounted upon said outer housing, and means providing an electrical connection between said electrodes and terminals, said last named means comprising roller bearings having outer races and inner races, the outer races being secured to said outer housing and the inner races being secured to said inner housing, and comprising conductors extending from said electrodes respectively through the walls of said inner housing, said conductors being respectively secured to the inner races of each of said bearings, and second connectors joined respectively to the outer races of said bearings to said terminals, one of said electrodes being effective to emit electrons and the other of said electrodes being effective to collect electrons previously deposited by the other of said electrodes on the insulating cylinder.

11. In apparatus for measuring the speed of a rotating member, a device comprising a housing, a shaft, means carried by said housing for rotatably journalling said shaft, a cylindrical rotor carried by said shaft, said cylindrical rotor comprising a cylindrical glass tube and an electrically conductive coating formed on the inner surface of said tube, a first electrode including a plurality of pointed electrode elements directed toward said rotor and being disposed adjacent to said rotor, and a second electrode including a plurality of pointed electrode elements directed toward and spaced from said rotor in an area spaced from said first electrode circumferentially with respect to said rotor, said first electrode being effective to emit electrons and said second electrode being effective to collect electrons previously deposited on said glass tube by said first electrode.

12. In apparatus for measuring the speed of a rotating shaft, a device comprising an elongated anode, an elongated cathode, said cathode being disposed parallel to said anode, a rotating member adapted for connection to said shaft, said rotating member having a peripheral surface disposed adjacent to said anode and cathode and having an axis of rotation parallel thereto, said anode and cathode being spaced circumferentially relative to said rotating member, the peripheral surface of said rotating member being formed of a dielectric material, said rotating member having conductive portions disposed radially inwardly of said surface, whereby said dielectric material is interposed between said conductive portions and said anode and cathode, and means for connecting said rotatable member to a rotatable shaft, the speed of which is to be measured, said cathode being effective to emit electrons and said anode being effective to collect electrons previously deposited on said dielectric material by said cathode.

13. In apparatus for measuring the speed of a rotating shaft, a device comprising an elongated anode, an elongated cathode, said cathode being disposed parallel to said anode, a rotating member adapted for connection to said shaft, said rotating member disposed adjacent to said anode and cathode and having an axis of rotation parallel thereto, said anode and cathode being spaced circumferentially relative to said rotating member, said rotating member having a peripheral surface formed of dielectric material and having conductive portions disposed radially inwardly of said surface whereby said dielectric material is interposed between said conductive portions and said anode and cathode, and evacuated means surrounding said anode, cathode and rotor, and means for effecting relative rotation between said rotor and said anode and cathode in accordance with the speed of rotation of said rotating shaft, said cathode being effective to emit electrons and said anode being effective to collect electrons previously deposited on said dielectric material by said cathode.

References Cited by the Examiner

UNITED STATES PATENTS

| | | | |
|---|---|---|---|
| 2,545,354 | 3/1951 | Hansen | 310—5 |
| 2,667,615 | 1/1954 | Brown | 317—250 X |
| 2,831,988 | 4/1958 | Morel | 310—6 |
| 3,024,371 | 3/1962 | Lefkowitz | 310—5 |

WALTER L. CARLSON, *Primary Examiner.*

SAMUEL BERNSTEIN, *Examiner.*